(12) United States Patent
De Renzis

(10) Patent No.: US 7,161,685 B1
(45) Date of Patent: Jan. 9, 2007

(54) METHOD FOR MEASURING THE DISTANCE OF AN OBJECT

(75) Inventor: Antonio De Renzis, Bentivoglio (IT)

(73) Assignee: Datalogic S.p.A., Bologna (IT)

( * ) Notice: Subject to any disclaimer, the term of this patent is extended or adjusted under 35 U.S.C. 154(b) by 0 days.

(21) Appl. No.: 09/437,469

(22) Filed: Nov. 10, 1999

(30) Foreign Application Priority Data

Aug. 4, 1999 (EP) .................................. 99830509

(51) Int. Cl.
*G01B 11/14* (2006.01)

(52) U.S. Cl. .................................................. 356/614
(58) Field of Classification Search ......... 356/600–624
See application file for complete search history.

(56) References Cited

U.S. PATENT DOCUMENTS

| 5,006,721 A | 4/1991 | Cameron et al. |
| 5,696,516 A | 12/1997 | Julian |
| 5,739,901 A | 4/1998 | Fujioka et al. |
| 5,867,125 A | 2/1999 | Cluff et al. |
| 6,392,755 B1 * | 5/2002 | Levecq et al. .............. 356/614 |
| 6,424,421 B1 * | 7/2002 | Cremer et al. .............. 356/620 |

FOREIGN PATENT DOCUMENTS

EP  0 652 530  5/1995

* cited by examiner

Primary Examiner—Zandra V. Smith
Assistant Examiner—Amanda Merlino
(74) Attorney, Agent, or Firm—Nixon & Vanderhye, P.C.

(57) ABSTRACT

A method for measuring the distance of an object from a measuring device is disclosed, said method comprising the following steps:

a) emitting a signal;
b) directing the signal towards an object;
c) detecting the signal diffused by the object;
d) comparing the detected signal with the emitted signal so as to obtain a comparison signal representing the distance travelled by the emitted signal and the object diffused signal. The method of the invention is characterized in that it comprises the steps of:
e) carrying out before step a) a measuring device calibration step so as to associate a prefixed comparison signal value to a prefixed distance value;
f) identifying the distance value associated, in the previous calibration step, to the value of said comparison signal obtained in step d);
g) associating the distance value identified in step f) to the comparison signal obtained in step d). In the calibration step, the luminous image diffused by a surface of known reflectance placed at a prefixed distance is detected to obtain a numerical value for at least a sample $x_j$, the prefixed distance value at which the surface of known reflectance has been placed is associated to said numerical value so obtained, and the previous steps are iteratively repeated for a prefixed number of times, each time moving the surface of known reflectance by a prefixed distance interval.

18 Claims, 3 Drawing Sheets

METHOD FOR MEASURING THE DISTANCE OF AN OBJECT

BACKGROUND OF THE INVENTION

1. Field of the Invention

The present invention relates to a method for measuring the distance of an object. In particular, the method of the present invention is carried out through an optical device for measuring the distance, which among the other things, is also able to read an optical code placed on the object.

2. Discussion of Prior Art

In many fields of the art, the measurement of the distance of an object is very useful, if not in some cases, essential. Consider, for example, all the mechanical machining where it is necessary to know the distance from the machine of the surface to be machined so as to position the tools correctly and/or to program the machine correctly, or all those cases in which knowing the distance parameter allows setting up instruments for the process optimization (for example, in the optics and photography fields, where the distance parameter is strictly connected to focusing issues).

Furthermore, the measurement of the distance of an object is often required in handling plants for the delivery and sorting of objects, where it is required to identify and classify objects having very different sizes, and to carry out an automatic measurement of the dimensions of objects, so as to accelerate and optimize the further stages of delivery and storage of the same.

Typically, these plants are provided with a conveyor belt on which the objects to be identified and sorted are placed, and with one or more optical devices, generally of the laser-light emission type (commonly referred to as laser scanner) intended for carrying out the reading of the optical codes and the measurement of the object dimensions.

For the purpose of making the above operations of reading and measurement reliable, it is preferable to previously have an information on the distance between the object and the laser scanner. In fact, knowing the distance parameter is useful on the one side to correctly focus the emission laser beam on the object to be scanned so as to make a correct reading of the optical code present on the object itself, and on the other side to determine the height of the latter and consequently, for example, its dimensions and/or volume. In addition, knowing the distance parameter in real time advantageously allows the adjustment of the operating parameters of the electronic circuits present in the scanner, so as to set prefixed operating configurations in the scanner itself.

Optical devices that can provide information on the distance of an object are already known. For example, the European patent application No. 0 652 530 by the same Applicant, describes a laser scanner having a high-frequency modulated laser-light emission wherein the distance of the object is obtained by the phase difference between the signal emitted by the scanner and the signal received. In particular, the scanner comprises a source of emission of amplitude-modulated laser light by a local oscillator; means of optical scanning to direct the laser light towards the object to be scanned, and light-receiving means to collect the light diffused by the illuminated object and generate an electric signal proportional to the intensity of the light diffused.

The signal generated by the light-receiving means is transmitted to a phase demodulator, which also receives a signal from the local oscillator; the demodulator measures a phase difference between the above indicated two signals and generates an electric signal proportional to said phase difference. Finally, suitable calculating means processes this electric signal so as to calculate a distance value based on the above phase difference.

It has been verified that the devices of the type described above do not allow carrying out a sufficiently precise measurement of the distance because of a certain number of drawbacks which cause an uncontrollable change of phase in the response signal generated by the phase demodulator, thus altering the measurement of the distance.

In fact, the phase response obtained from the modulated-light devices is related to the distance of the object that reflects the modulated light by a relation as the following one:

$$D = A_0 + A * arc\ \cos(\phi + \phi_0)$$

wherein:

D is the distance of the object;

$A_0$ is the offset of the amplitude of the signal generated by the phase demodulator;

A is the amplitude of the signal generated by the phase demodulator;

$\phi$ is the phase of the signal generated by the phase demodulator;

$\phi_0$ is the initial phase of the emission signal.

In this description and following claims, the term: offset of the signal, refers to a position error on the plane of the phase/distance transfer function.

Therefore, the measurement of the distance requires the knowledge of parameters A, $A_0$ and $\phi_0$, and of the phase $\phi$ of the response signal generated by the phase demodulator.

However, the use of this formula would be correct if the response given by the optical/electronic (scanning generation, demodulation, amplification and filtration) measurement system were of the linear type. Actually, however, the optical/electronic system has intrinsic non-linearity (due, for example, to the non-linearity of the single demodulation, amplification and filtration systems) that make the above relation inapplicable from a practical point of view. In addition, the above non-linearity changes from apparatus to apparatus.

One of the most evident problems associated to the use of this relation, for example, is correlated to the fact that, to have a response as much linear as possible from the measurement system, it is necessary to work within a prefixed interval of values of phase $\phi$, in particular, in the range comprised between $\phi=0$ and $\phi=1$. In this interval, as the phase increases, the distance calculated suddenly decreases. This means that also small quantities of noise on the signal can cause significant changes in the distance value calculated by the above relation.

Furthermore, the above relation shows that undesired and uncontrolled changes in the phase $\phi$ alter the measurement of the distance. These variations can be caused, for example, by changes in the operating temperature of the device, which cause an uncontrollable variation of the distance signal/distance transfer function, and in particular, of the phase of the signals emitted and received respectively by the device itself.

Also the electronic components of the device (in particular, the phase demodulator, the amplifier and the band-pass filter) introduce uncontrollable variations in the transfer function with the temperature, and thus, in the phase of the response signal at the output of the phase demodulator.

In addition, ageing and dimensional tolerances of the optical and electronic components of the devices themselves cause uncontrollable variations in the phase of the response signal.

In short, it has been verified that the above problems found in modulated-light devices imply a general error of measurement of the distance which is in the order of 5% on average. This error percentage restricts the use of the above devices only to those applications where a not repeatable and very precise measurement of the distance is required.

An attempt to overcome the above drawbacks consists in effecting a setting operation of the response curve of the device: in practice, an object is placed at a certain known distance from the device and, observing the behavior of the response signal through an oscilloscope, the device is adjusted by a potentiometer so that the phase response curve gives a prefixed distance value (equal to that at which the object has been placed). However, this setting operation is quite approximate. In fact, it is based on operations depending on the operator's sensitivity (such as the visual observation of the curve behavior, and its comparison with an ideal behavior), which can clearly cause several mistakes, thus giving unreliable results.

Other devices are known for the measurement of the distance of an object in relation to the so-called "time of flight" of a pulse applied to an emission laser. In particular, the time taken by the pulse to travel the optical distance from the emission means to the object, and from the latter to the light-receiving means is measured. This time is proportional to twice the distance between object and device.

However, it has been verified that although pulse devices do not specifically suffer the previously listed drawbacks, they suffer from problems implying intrinsic errors of precision and repeatability, assessable in the order of ±5 cm, thus being particularly adapted for measuring the distance of large objects and with quite extended scanning areas.

The technical problem at the basis of the present invention is to carry out a simple and reliable measurement of the distance, that is to provide for a reliable distance measurement which is not influenced by the intrinsic non-linearity of the system.

SUMMARY OF THE INVENTION

Therefore, the present invention relates to a method for measuring the distance of an object from a measuring device, comprising the following steps:
 a) emitting a signal;
 b) directing the signal towards an object;
 c) detecting the signal diffused by the object;
 d) comparing the detected signal with the emitted signal so as to obtain a comparison signal representing the distance travelled by the emitted signal and the object diffused signal;
characterized in comprising the steps of:
 e) carrying out before step a) a measuring device calibration step so as to associate to a prefixed comparison signal value a prefixed distance value;
 f) identifying the distance value associated, in the previous calibration step, to the value of said comparison signal obtained in step d);
 g) associating to the comparison signal obtained in step d) the distance value identified in step f).

Advantageously, therefore, the method of the invention comprises a calibration step that is carried out before the distance measurement steps. Said calibration step is assigned to associate a prefixed distance value to a prefixed value of a comparison signal representing a prefixed point of the scanning line, when it is positioned at the prefixed distance from the measuring optical device. The measurement of the distance of an object consists in detecting the signal diffused by the object. To this signal is associated the distance value that, in the previous calibration step, had been associated to the same value of the signal.

Thus, the method of the invention can be easily carried out and is highly reliable, since the distance measurement does not require operations which are left to the operator's sensitivity (such as those above mentioned of visual observation and comparison of the phase response curve), and because said measure is insensitive to the intrinsic non-linearity of the system.

The method of the invention allows to measure the distance of a single point of the object and it can be carried out by any conventional optical device implemented with suitable means of calculation for effecting the calibration and distance measurement steps according to the present invention.

Advantageously, the method of the invention further comprises the following steps:
 carrying out at least one scan on the object along at least one scanning line;
 measuring the distance of a plurality of points on the scanning line. Thus, it is possible to obtain information about the distance of a line or of a object surface from the measuring device.

Preferably, the emitted signal is a light beam adapted to illuminate the object along an emission optical path and the detected signal is an analogue electric signal proportional to the luminous image diffused by the object along a receiving optical path.

In a particularly advantageous embodiment, the method of the present invention comprises the following steps:
 a1) carrying out at least one scan on the object along at least one scanning line;
 b1) acquiring an analogue electric signal representative of the luminous image diffused by the object along the scanning line;
 c1) carrying out a sampling of the analogue electric signal at a prefixed sampling frequency so as to extract at least one sample $x_k$ representative of at least one point of the scanning line;
 d1) converting the sampled analogue signal into digital signal so as to obtain a numerical value of said at least one sample $x_k$; wherein, in the calibration step, a numerical value and a distance value is associated to a prefixed sample, and comprising, in addition, the following steps:
 f1) identifying the distance value which, in the previous calibration step, has been associated to said numerical value obtained in step d1), and to said sample $x_k$;
 g1) associating the distance value determined in step f1) to the numerical value obtained in step d1).

Advantageously, therefore, in the method of the invention the calibration step is assigned to identify the numerical value generated by the analogue to digital converter for a prefixed sample representative of a prefixed point on the scanning line, when the latter is placed at a predetermined distance from the measuring optical device. Then, the distance measurement of an object consists in detecting the numerical value of the electric signal and obtaining, by this numerical value, the distance value which, in the previous calibration step, had been associated to the same numerical value and to the same sample.

Advantageously, the calibration step is carried out during the manufacturing process of the measuring device, and it can be periodically repeated so as to consider any possible changes in the parameters of the device itself during operation.

Preferably, the method of the invention comprises the additional step h) of storing the distance value obtained for sample $x_k$ in step g1) and iteratively repeating the previous steps starting from step d1) for each further sample $x_{k+1}$. In this way, it is possible to obtain the distance profile of the object measured by the scan. This allows to obtain information on the dimensions of the object itself and on its volume.

Preferably, the calibration step comprises the following steps:
  carrying out at least one scan along a scanning line on a surface of known reflectance placed at a prefixed distance;
  acquiring an analogue electric signal representative of the reflectance of said surface along the scanning line;
  carrying out a sampling of the acquired analogue signal at a sampling frequency equal to the one prefixed, so as to extract at least one sample $x_j$ representative of at least one point on the scanning line;
  converting the sampled analogue signal into digital signal so as to obtain a numerical value for said at least one sample $x_j$;
  associating to said numerical value obtained for said at least one sample $x_j$ the prefixed distance value at which the surface of known reflectance has been placed, and iteratively repeating the previous steps for a prefixed number of times, each time moving the surface of known reflectance by a prefixed distance interval.

According to the invention, the calibration step is effected by carrying out at least one scan, along a respective scanning line, on a surface of known reflectance (for example a white surface) which is subsequently placed at various prefixed distances. The light diffused by the surface of known reflectance contains only information relating to the distance of the various points of the scanning line. It is thus possible to calibrate the measuring device so as to measure correctly, afterwards, the distance of any object, independently of its reflectance.

The execution of a calibration step as that described above advantageously allows to compensate the various differences existing among the devices (for example, the various devices may differ for the positioning of the laser scanning beam), the possible non-linearity of the response given by the demodulator, and the differences, existing among the devices, in the speed profile and, thus, in the distance travelled in a prefixed time interval by the point generating the scan.

In addition, the execution of the above described calibration step allows effecting an easy and reliable distance measurement also when the measuring device is placed transversely, or with a certain inclination, with respect to the object of which the distance is being measured. In this case, with the prior-art methods for measuring the distance, it would have been necessary to carry out a following trigonometric computing of the distance measurement so as to obtain the actual height of the various points of the object, said computing requiring the exact knowledge of the angle of inclination of the device. On the contrary, according to the method of the present invention, it is sufficient to carry out the calibration step with the device inclined as required by the particular application, to obtain the actual heights of the various points of the object.

Preferably, the calibration step further comprises the following steps:
  carrying out the measurement of the distance of at least one reference means of known reflectance placed at a prefixed distance from the measuring device, thus acquiring at least one electric signal representative of said distance;
  associating to the above electric signal the value of the prefixed distance at which the reference means of known reflectance has been placed, and iteratively repeating the previous steps for all references means of known reflectance placed at the prefixed distances.

This allows to continuously update the calibration of the measuring device by a limited number of distance measurements, so as to recover the intrinsic non-linearity of the system and the changes in the response of the system caused by the change of the environmental conditions.

According to a preferred embodiment of the method of the invention, a plurality of scans of the surface of known reflectance are carried out along the scanning line, and a plurality of samples $x_j$ are extracted for each scan, where j=1, . . . ,N, and N is the maximum number of extractable samples for each scan.

Preferably, the method of the invention further comprises the following steps:
  obtaining a mean scan of the plurality of scans effected;
  processing the mean scan so as to obtain said numerical value for said at least one sample $x_j$.

More preferable, the mean scan is obtained by calculating the arithmetical mean, or any other type of mean, of the numerical values obtained for each sample $x_j$ in the various operations of scanning carried out. In this way, it is possible to increase the reliability of the calibration effected and, consequently, of the distance measurement.

Preferably, the calibration step further comprises the step of filling with the distance values associated to the numerical values obtained for the samples $x_j$, the items of a calibration matrix having, as index of column j a number from zero to the number of samples $x_j$ extracted, and as index of row i, a number from zero to the maximum value of the numerical value obtained after the analogue to digital conversion of the signal.

Advantageously, the calibration step generates a calibration matrix in which each item (i, j) of the matrix contains the distance value of the point of the scanning line which provides, for the sample $x_j$, the numerical value of phase response i. In this way, the storing of the distance values associated to the numerical values obtained for the various samples $x_j$ during the calibration step and their identifying during the distance measurement steps are extremely easy.

Preferably, the method of the present invention further comprises the step of providing the matrix with a number of items (i, j) higher than the number of samples $x_j$, and filling the empty items (i, j) of the matrix. More preferably, the step of filling the empty items (i, j) of the matrix comprises the step of locating, column by column, the empty items (i, j) of the matrix and filling each of these empty items with a value obtained by linearly interpolating between the two numerical values differing from 0 that are nearer to the empty item, and belonging to the same column. In this way, it is possible to obtain a calibration matrix that is complete in all its items, so as to go on to the following steps of distance measurement.

As already known, the measuring optical devices carry out a sampling of the scanning at regular time intervals, to which not necessarily correspond regular space intervals of the point generating the scan. This is essentially due to the particular speed profile which the point generating the scan has, this profile depending, for example, on the rotor geometry, on the impact point of the luminous spot on the rotor mirror, and on the dimensions of the spot. These parameters are not easily controllable, which is why all devices can have differences in the speed profile and thus, in the space covered in a prefixed time interval. For the purpose of overcoming the above problems, the method of the present invention comprises the step of associating to said at least one sample $x_j$ a respective linear position on the scanning line.

Preferably, this step comprises the following steps:

positioning on the scanning line, at a prefixed distance, a grid composed of alternated light and dark equally-spaced intervals having known dimension;

detecting the intervals of the grid in sequence, storing each time the time needed to travel each interval of the grid, in an item of a calibration table;

summing each time all the items stored up to that moment starting from the first one up to reach a known prefixed value representing the time at which a prefixed sample is generated;

identifying the position of sample $x_j$ on the scanning line as that point of the scanning line having a distance value from the scan starting point equal to the value obtained by the previously effected sum.

In this way, it is possible "to map" the speed profile of each device, thus creating a univocal association between number of the sample and its position along the scanning line at the prefixed distance.

Preferably, the method of the present invention further comprises the step of reading an optical code placed on the object. In this case the electric signal generated by the light-sensitive means, besides being used to measure the distance of a point of the object, or more distances on a surface of the object, is processed by suitable processing means to allow carrying out the reading of an optical code placed on the object.

In this description and following claims, the term: optical code, refers to a code (such as, for example, a bar code, a two-dimensional code, and the like) adapted to univocally identify the objects on which it is provided.

Advantageously, the reading of the optical code is carried out by using the same device used for measuring the distance. Preferably, it comprises an amplitude demodulator, a digitizer and a decoder. In this way, it is possible to associate the distance information (or the dimensions or volume information) to other information of identifications reported on the optical code, such as type of product, manufacturer, price, place of origin, destination, etc.

BRIEF DESCRIPTION OF THE DRAWINGS

Further features and advantages of the method of the present invention will appear more clearly from the following detailed description of a preferred embodiment, made with reference to the attached drawings. In such drawings.

DETAILED DISCUSSION OF PREFERRED EMBODIMENTS

The method of the invention allows to carry out a reliable measurement of the distance of an object thanks to the realization of a calibration step, which is effected before the steps for measuring the distance, and it is intended to associate a prefixed distance value to a prefixed value of a comparison signal representative of a prefixed point on the scanning line, when the latter is positioned at the prefixed distance from the measuring optical device. The measurement of the distance of an object afterwards consists in detecting the signal diffused by the object. This signal is associated to the distance value that had been associated to the same value of the signal in the previous calibration step.

Figure 2:
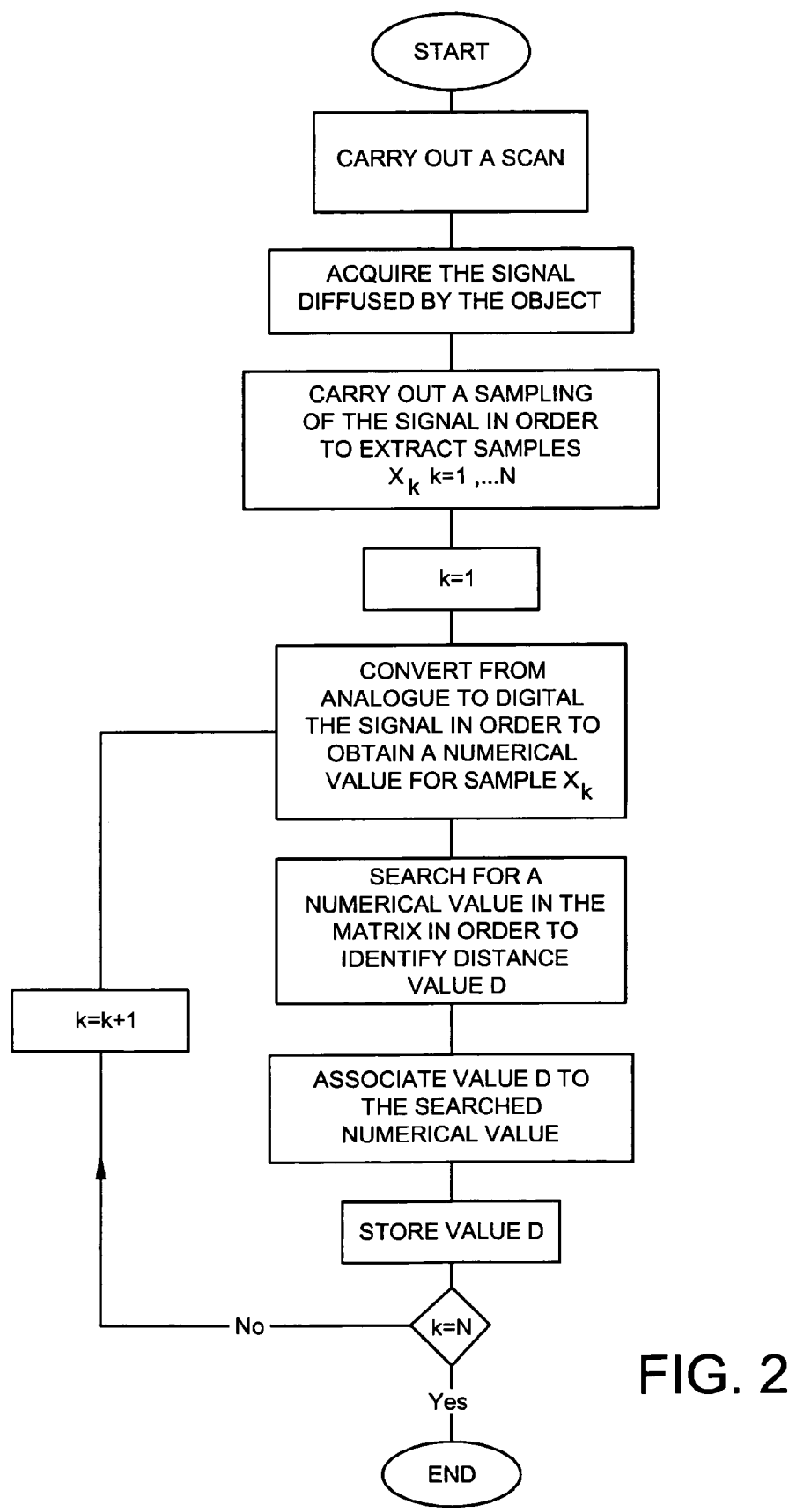
FIG. 2 shows a flow diagram relating to a preferred embodiment of the method shown in FIG. 1.
Figure 3:
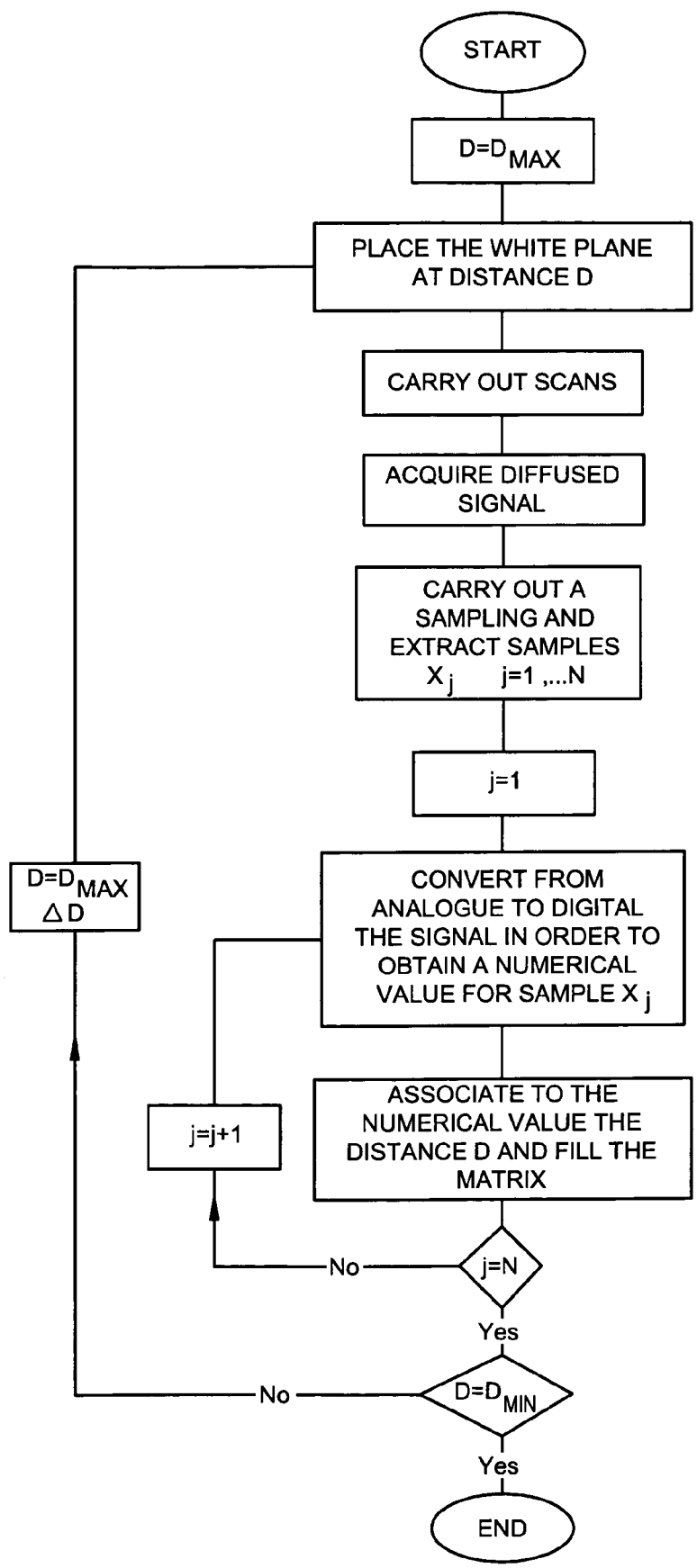
FIG. 3 shows a flow diagram relating to a calibration step carried out in the method shown in FIG. 2.

In the preferred embodiment shown in FIGS. 2 and 3, at least one scan on the object is carried out by a light beam adapted to illuminate the object along an emission optical path; the detected signal is therefore an analogue electric signal proportional to the luminous image diffused by the object along a receiving optical path.

In this case, the calibration step consists in identifying the numerical value generated by the analogue-to-digital converter for a plurality of samples representative of respective points on the scanning line when the latter is placed at a predetermined distance from the measuring optical device. The measurement of the distance of an object consists then in detecting the light diffused by the object and obtaining, for each sample, a numerical value by the analogue-to-digital converter. To this numerical value is then associated the distance value which had been associated to the same numerical value and to the same sample in the previous calibration step.

The method of the invention can be carried out by any conventional optical device, such as that described in the European patent application No. 0 652 530 by the same Applicant (of which the device of the invention is an improved embodiment), implemented with suitable means of calculation for the realization of the calibration and distance measurement steps according to the present invention.

For the purpose of making the present discussion clearer, the description of the method of the invention is made starting from the description of the calibration step which, as already said, is carried out during the manufacturing process of the measuring optical device, and which can be repeated over time so as to consider possible changes in the parameters of the device during operation.

With particular reference to FIG. 3, the calibration step consists in placing a surface of known and constant reflectance (for example a white plane) covering the entire scanning generated by the device, in front of the measuring device, at a prefixed distance D. The surface is subsequently moved by a prefixed distance interval $\Delta D$ (for example, $\Delta D=5$ cm), starting from the maximum distance Dmax that the device can measure, to the detectable minimum distance Dmin. At each distance D at which the white surface is placed, the device carries out a scanning on the surface along a scanning line and acquires an analogue electric signal representative of the reflectance of the white surface along the scanning line. This signal contains information relating only to the distance of the various points of the scanning line from the measuring device.

Afterwards, the detected analogue signal is sampled at a prefixed sampling frequency so as to extract a number of samples $x_j$ (with $j=1, \ldots, N$, where N is the maximum number of samples extractable for each scan, for example, 200) representative of respective points of the scanning line. The sampled analogue signal is then converted into digital signal so as to obtain a numerical value for each sample $x_j$.

It is possible to obtain directly a digital signal by using other types of sensors, such as a series of photo-resistors or C-MOS sensors (all of the conventional type).

To the numerical values thus obtained is associated the prefixed distance value at which the white surface has been placed, and the previous steps are iteratively repeated for a prefixed number of times, each time moving the white surface by a prefixed distance interval ΔD (for example, 5 cm) from the Dmax to the Dmin. The process can also be inverted, that is, starting from the minimum distance Dmin and moving each time the white surface by a distance interval ΔD from the minimum distance Dmin to the maximum distance Dmax.

In the preferred embodiment of the method of the present invention, a plurality of scans of the white surface are carried out along the scanning line (when the object is not in motion with respect to the measuring device) or along respective scanning lines (when the object is moving with respect to the measuring device, as for example when it is positioned on a conveyor belt). A mean scan is then extracted by the plurality of scans carried out, and it is then processed so as to obtain, for each sample of the mean scan, a numerical value to which a distance value is associated.

The mean scan is obtained by making an arithmetical mean of the numerical values obtained for each sample $x_j$ in the various operations of scanning effected. Of course, it is possible to effect other types of mean (geometric, quadratic, ponderal, etc.) to obtain the mean scan.

For example, let us suppose that three scans are effected, extracting afterwards from the signal 5 samples for each scan, thus obtaining the following numerical values:

| | | | | | |
|---|---|---|---|---|---|
| 1st scan | 10 | 13 | 13 | 14 | 15 |
| 2nd scan | 11 | 12 | 11 | 13 | 12 |
| 3rd scan | 10 | 11 | 12 | 12 | 13 |

The mean scan (by arithmetical mean) will have the following values:

| | | | | | |
|---|---|---|---|---|---|
| Mean scan | 10 | 12 | 12 | 13 | 13 |

From the practical point of view, the association of the distance values to the numerical values in the calibration step of the method of the present invention is made by filling the items of a calibration matrix having as index of column j a number from zero to the number of samples $x_j$ extracted (for example, 200), and as index of row i, a number from zero to the maximum value of the numerical value obtained after the analogue to digital conversion of the signal (which, in the specific example of the present invention is an 8-bit signal, and therefore the maximum value is 255). In substance, at each prefixed distance, for each sample $x_j$ a numerical value "I" is obtained, and the item of the matrix identified in correspondence with the column having an index j=$x_j$ and with the row having an index i=I, is filled with the prefixed distance value.

Therefore, in the example shown, the "distances-samples" calibration matrix is obtained by moving the white surface each time by a prefixed distance interval (ΔD=5 cm) and effecting 200 samplings for each scan. Supposing a 1 m width of the conveyor belt, and a constant scanning speed of the laser beam on the entire scan, the matrix obtained is representative of a "reticule" of distances having a resolution (elementary dimension) of 0.5 in width and 5 cm in height. Changing the interval of distance ΔD and the number of samplings, it is possible to obtain a calibration matrix representative of a "reticule" of distances of any elementary dimension, that is, having a lower or higher resolution in both directions (height and width) according to the requirements relating to the specific application.

An alternative way to obtain a calibration matrix representative of a "reticule" of distances with a precision in height higher than that obtained with the interval of distance ΔD=5 cm is that of providing a matrix with some empty items (i, j). In this case, to have a complete matrix, that is to say, in which all items (i, j) contain a respective distance value, a linear interpolation is effected column by column as follows: column by column, the empty items (i, j) of the matrix are located; each located empty item is then filled with a numerical value which is obtained by linearly interpolating between the two numerical values differing from 0 that are nearer to the empty item in question, and belonging to the same column.

For example, after the interpolation, the left column will become as the right one:

| | |
|---|---|
| 10 | 10 |
| 0 | 13 |
| 0 | 16 |
| 20 | 20 |
| 0 | 25 |
| 0 | 30 |
| 35 | 35 |
| 0 | 53 |
| 0 | 71 |
| 90 | 90 |

Of course, other types of interpolation are possible besides the linear one.

The possibility of increasing the precision of the reticule of distances in height (by means of the above alternative method) can be particularly advantageous when the calibration matrix is required to be continuously updated in real time so as to recover the intrinsic non-linearity of the system and the changes in the response of the system caused by the change in the environmental conditions. In fact, when said conditions change, the response of the system can change too. In this case, the data read from the calibration matrix will change, too, and it will not reflect the new operating situation. Therefore, it is possible to update the matrix by frequently effecting some "simplified" calibrations, which consist in illuminating some reference means having known reflectance, placed at known distances (inside or outside the measuring device), and carrying out a limited number of distance measurements on said reference means.

In conclusion, the calibration step brings to the generation of a calibration matrix in which each item (i, j) of the matrix contains the distance value of the point of the scanning line which provides, for the sample j, the numerical value of phase response i. This matrix is then used during the steps for measuring the distance of an object.

Figure 1:
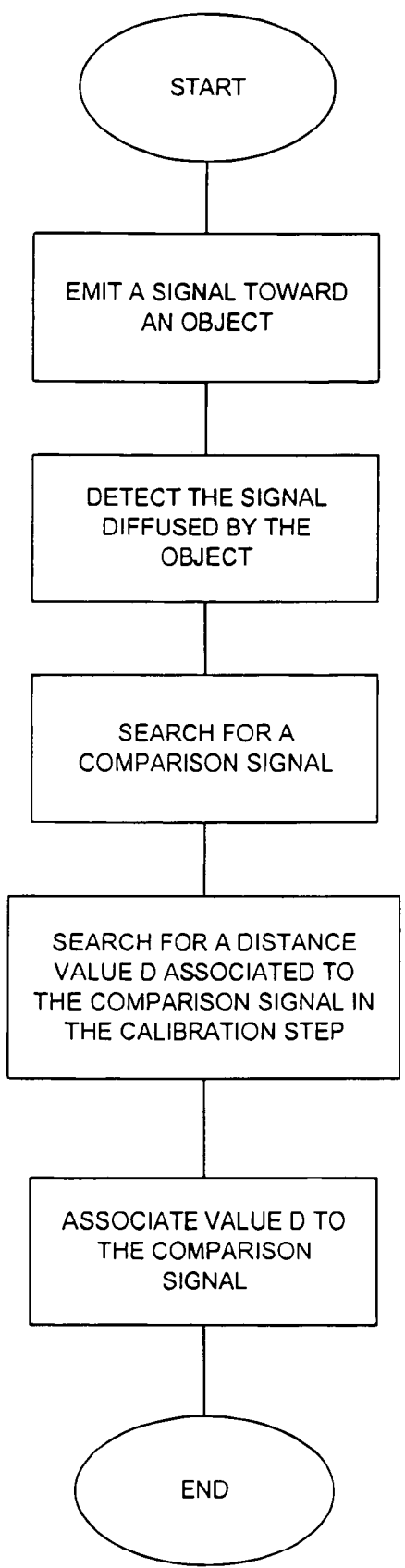
FIG. 1 shows a flow diagram relating to a method for measuring the distance according to the present invention.

With reference to FIGS. 1 and 2, the method for measuring the distance according to the present invention comprises the starting steps of carrying out a plurality of scans of the object along at least one scanning line and, for each scan carried out, acquiring an analogue electric signal representative of the luminous image diffused by the object along the scanning line.

The detected analogue signal is then sampled at a sampling frequency equal to that used in the calibration step, so as to extract a number of samples $x_k$ (with k=1, ... N, where N is the maximum number of samples extractable from each scan, for example 200) representative of respective points of the scanning line (it must be noted that the number of samples $X_k$ extracted in this step is equal to the number of samples $x_j$ extracted in the calibration step). The sampled analogue signal is then converted into digital signal so as to obtain a numerical value k for each sample $x_k$.

It is possible to obtain directly a digital signal by using other types of sensors, such as a series of photo-resistors or C-MOS sensors (all of the conventional type).

To each sample $x_k$ thus obtained is associated the distance value that, in the calibration matrix, is to be found in the item (i, j) located in correspondence with the row having an index i=k and with the column having an index $j=x_k$, that is the distance value that in the calibration step had been associated to the same numerical value k and to the same sample $x_j$=k.

The distance so obtained is then stored in a table, and the previous steps are iteratively repeated for each further sample $x_{k+1}$ so as to obtain the distance profile of the object. This allows to obtain information on the dimensions of the object and on its volume too.

In the preferred embodiment, the method of the invention also comprises a step in which each sample $x_j$ is associated to a respective linear position on the scanning line.

In fact, as already said, the sampling of the scan is effected at regular time intervals, to which not necessarily correspond regular space intervals of the point generating the scan. This is due to the fact that the speed of the point generating the scan (spot) may not be constant from the beginning to the end of the scan itself.

For the purpose of creating a univocal association between the number of the sample and its position along the scanning line at a prefixed distance, a grid composed of alternated white and black equally-spaced intervals (for example 1 cm) having known dimension is positioned along the scanning line, at a prefixed distance D. Successively, the reflectance signal diffused by the grid is acquired, thus detecting the sequence of black and white intervals as time intervals, and storing each time, in an item of a calibration table, the time needed to travel each interval of the grid.

In particular, a calibration table is created in which each item shows the time needed to cover the single white or black intervals of the grid used for the calibration and, once the time interval needed to move from a sample to the other (sampling period) is known, it is possible to obtain the instant $T_j$ in which a certain sample j is generated (by multiplying j by the sampling period).

Once the instant of time $T_j$ is known, all the items of the table stored until that moment are summed up, starting from the first one until a value close to the value of $T_j$ is reached: the number of items summed up gives the distance, for example in centimeters, of the sample j from the scan starting point on the scanning line.

This step, which is adapted to create a univocal association between the number of the sample and its position along the scanning line at a prefixed distance, is carried out once and then it is stored in the non volatile memory of the device. It must be noted that, if more samples fall within the same centimeter, a higher resolution will be obtained.

The sample-centimeter association is memorized for a prefixed distance D. Nevertheless, it is possible to obtain it for any distance from the measuring device by using common trigonometric formulas.

In fact, if D is the distance between measuring device and scanning line, and M is the distance between the perpendicular plotted by the output window of the laser beam from the measuring device and the beginning of the scanning along the scanning line, the position X' of sample j along the scanning line at a distance D' different from D will be given by the following formula:

$$X'=M-(M-X)*D'/D$$

where X is the position of sample j along the scanning line at a distance D.

Therefore, the method of the present invention advantageously allows obtaining, for each sample of the scanning line, its height and position along the scanning line. The position of the samples on the advancement axis of the conveyor belt can be measured through traditional methods (encoder, or a priori knowledge of the transport speed).

With the method of the present invention, therefore, it is possible to measure the space co-ordinates of each point of the object so as to calculate its dimensions and/or volume.

In the first embodiment shown, the method of the present invention also allows measuring the distance of a single point of the object from the measuring device, still having all the above advantages. In this case, it is not necessary to generate any scan (a fixed laser beam being enough), and it is not necessary to effect the sampling of the signal (since in the distance measurement step there is a single value of electric signal). In addition, by using some light-receiving devices for the luminous signal, such as some light-resistors or C-MOS sensors (which already provide a digital signal), the digitization of the analogue signal is not required, either.

Preferably, the method of the present invention also comprises the step of reading an optical code placed on the object, so as to associate the distance information (or the dimensions, or volume information) to other information of identifications reported on the optical code, such as type of product, manufacturer, price, place of origin, destination, etc. In this case, besides being used to measure the distance of a point of the object or more distances on a surface of the object, the electric signal generated by the detecting means is processed by suitable elaborating means to allow effecting the reading of an optical code placed on the object.

What is claimed is:

1. Method for measuring the distance of an object from a measuring device, comprising the following steps:
    a) emitting a signal, wherein the emitted signal is a light beam adapted to illuminate the object along an emission optical path and said emitting step includes carrying out at least one scan on the object along at least one scanning line;
    b) directing the signal towards an object;
    c) detecting a signal diffused by the object, wherein the detected signal is an analogue electric signal representative of the luminous image diffused by the object along the scanning line;
    d) carrying out a sampling of an analogue electric signal representative of a distance travelled by the emitted signal and the object diffused signal, so as to extract at least one sample $x_k$ representative of at least one respective point of the scanning line and converting the sampled analogue signal into a digital signal so as to obtain a numerical value of said at least one sample $x_k$;

e) wherein, prior to carrying out step a) there is a measuring device calibration step so as to associate at least one calibration sample $x_j$ of a calibration distance signal and a respective numerical value of said at least one sample $x_j$ with a prefixed distance value;

f) identifying the prefixed distance value associated, in the previous calibration step, with the numerical value of said at least one sample $x_k$ and corresponding at least one sample $x_k$ obtained in step d); and g) associating the prefixed distance value identified in step (f) with the numerical value of said at least one sample $x_k$ obtained in step d).

2. Method according to claim 1, further comprising the following steps:

carrying out at least one scan on the object along at least one scanning line;

measuring the distance of a plurality of points on the scanning line.

3. Method according to claim 1, comprising the additional step of storing the distance value obtained for sample $X_k$ in step g) and iteratively repeating the previous steps starting from step d) for each further sample $X_{k+1}$, wherein k=1, . . . ,N.

4. Method according to claim 1, wherein the calibration step comprises the following steps:

emitting a signal carrying out at least one scan along a scanning line on a surface of known reflectance placed at a prefixed distance;

acquiring an analogue electric signal representative of the reflectance of said surface along the scanning line;

carrying out a sampling of a calibration analogue signal representative of the distance travelled by the emitted signal and the surface diffused signal, at a prefixed sampling frequency, so as to extract a plurality of calibration samples $x_j$, where j=1, . . . ,N, representative of corresponding points on the scanning line;

converting the sampled calibration signal representative of the distance into digital signal so as to obtain numerical values for said plurality of calibration samples $x_j$;

associating each calibration numerical value obtained for said plurality of samples $x_j$ and corresponding sample $x_j$ with the prefixed distance value at which the surface of known reflectance has been placed, and iteratively repeating the previous steps for a prefixed number of times, each time moving the surface of known reflectance by a prefixed distance interval.

5. Method according to claim 4, wherein the calibration step further comprises the following steps:

carrying out a plurality of scans of the surface of known reflectance along the scanning line;

extracting a plurality of samples $x_j$ for each scan, where j=1 . . . N;

obtaining a mean scan of the plurality of scans effected;

processing the mean scan so as to obtain said numerical value for said at least one sample $x_j$.

6. Method according to claim 5, wherein the mean scan is obtained by calculating the arithmetical mean of the numerical values obtained for each sample $x_j$ in the various operations of scanning effected.

7. Method according to claim 5, wherein the calibration step also comprises the step of filling with the prefixed distance values associated to the numerical values obtained for the calibration samples $x_j$, the items of a calibration matrix having, as index of column j a number from zero to the number of calibration samples $x_j$ extracted, and as index of row i, a number from zero to the maximum value of the numerical value obtained after the analogue to digital conversion of the calibration signal representative of the distance.

8. Method according to claim 7, further comprising the step of providing the matrix with a number of items (i, j) higher than the number of samples $x_j$, and filling the empty items (i, j) of the matrix.

9. Method according to claim 8, wherein the step of filling the empty items (i, j) of the matrix comprises the step of identifying, column by column, the empty items (i, j) of the matrix and filling each of these empty items with a value obtained by linearly interpolating between the two numerical values differing from 0 that are nearer to the empty item, and belonging to the same column.

10. Method according to claim 4, comprising the step of associating to said at least one sample $x_j$ a respective linear position on the scanning line.

11. Method according to claim 10, wherein the step of associating to the sample $x_j$ a respective linear position on the scanning line comprises the following steps:

positioning on the scanning line, at a prefixed distance, a grid composed of alternated light and dark equally-spaced intervals having known dimension;

detecting the intervals of the grid in sequence, storing each time the time needed to travel each interval of the grid, in an item of a calibration table;

summing up each time all the items stored until that moment starting from the first one up to reach a known prefixed value representing the time at which a prefixed sample is generated;

identifying the position of sample $x_j$ on the scanning line as that point of the scanning line having a distance value from the scan starting point equal to the value obtained by the previously effected sum.

12. Method according to claim 1, further comprising the step of reading an optical code placed on the object.

13. Method for measuring the distance of an object from a measuring device, comprising the following steps:

a) emitting a signal, wherein the emitted signal is a light beam adapted to illuminate the object along an emission optical path and said emitting step includes carrying out at least one scan on the object along at least one scanning line;

b) directing the signal towards an object;

c) detecting the signal diffused by the object, wherein the detected signal is an analogue electric signal representative of the luminous image diffused by the object along the scanning line, d) carrying out a sampling of an analogue electric signal representative of the distance travelled by the emitted signal and the object diffused signal at a prefixed sampling frequency so as to extract at least one sample $x_k$ representative of at least one respective point of the scanning line and converting the sampled analogue signal into digital signal so as to obtain a numerical value of said at least one sample $x_k$;

e) wherein, prior to step a) there is a measuring device calibration step so as to associate at least one calibration sample $x_j$ of a calibration distance signal and a respective numerical value of said at least one calibration sample $x_j$ with a prefixed distance value;

f) identifying the prefixed distance value associated, in the previous calibration step, with the numerical value of said at least one sample $x_k$ and corresponding at least one sample $x_k$ obtained in step d); and g) associating the prefixed distance value identified in step f) with the numerical value of said at least one sample $x_k$ obtained in step d);

wherein the calibration step comprises the following steps:

emitting a signal carrying out at least one scan along a scanning line on a surface of known reflectance placed at a prefixed distance;

acquiring an analogue electric signal representative of the reflectance of said surface along the scanning line;—carrying out a sampling of a calibration analogue signal representative of the distance travelled by the emitted signal and the surface diffused signal, at a sampling frequency equal to the one prefixed, so as to extract at least one calibration sample x; representative of at least one corresponding point on the scanning line;

converting the sampled calibration analogue signal representative of the distance into digital signal so as to obtain a numerical value for said at least one calibration sample $x_j$;

associating each calibration numerical value obtained for said at last one sample $x_j$ and corresponding calibration sample $x_j$ with the prefixed distance value at which the surface of known reflectance has been placed, and iteratively repeating the previous steps for a prefixed number of times, each time moving the surface of known reflectance by a prefixed distance interval, wherein the calibration step also comprises the steps of filing with the distance values associated to the calibration numerical values obtained for the calibration samples $x_j$, the items of a calibration matrix having, as index of column j a number from zero to the number of samples $x_j$ extracted, and as index of row i, a number from zero to the maximum value of the numerical value obtained after the analogue to digital conversion of the signal, wherein filling the empty items (i, j) of the matrix comprises the step of identifying, column by column, the empty items (i, j) of the matrix and filling each of these empty items with a value obtained by linearly interpolating between the two numerical values differing from 0 that are nearer to the empty item, and belonging to the same column; and providing the matrix with a number of items (i, j) higher than the number of samples $x_j$.

14. Method according to claim 1, wherein said signal representative of the distance is the detected signal diffused by the object.

15. Method according to claim 1, wherein said calibration signal is the detected signal diffused by the surface of known reflectance.

16. Method according to claim 1, wherein said signal representative of the distance is a comparison signal obtained comparing the detected signal diffused by the object with the emitted signal.

17. Method according to claim 1, wherein said calibration signal is a comparison signal obtained comparing the detected signal diffused by the surface of known reflectance with the emitted signal.

18. Method according to claim 1, wherein the signal representative of the distance is sampled at a frequency equal to the prefixed sampling frequency of the calibration signal.

* * * * *